Patented Dec. 31, 1946

2,413,408

UNITED STATES PATENT OFFICE 2,413,408

FUMIGANT AND PROCESS OF FUMIGATING

Willis Conard Fernelius, Dayton, Ohio, and Frank Leslie Campbell, Rockville, Md.

No Drawing. Application July 21, 1944, Serial No. 546,060

10 Claims. (Cl. 167—39)

1

This invention, which is a continuation-in-part of the invention of our application Serial No. 403,873, filed July 24, 1941, and published August 7, 1945, as United States Patent No. 2,381,257, relates to the preparation of addition products of sulfur dioxide and dioxan (diethylene oxide) and to the use of the compounds in a process for killing insects.

In accordance with this invention, sulfur dioxide and diethylene oxide are reacted at relatively low temperatures to form new addition compounds having the formula $O(C_2H_4)_2O \cdot SO_2$ and $O(C_2H_4)_2O \cdot 2SO_2$. It is believed that the oxygen atoms of the dioxan serve individually as donors of pairs of electrons to the sulfur atom of sulfur dioxide. In this way, a relatively weak linkage is formed between said oxygen and sulfur atoms. When dioxan and sulfur dioxide are reacted in equimolecular proportions, a compound having the formula $O(C_2H_4)_2O \cdot SO_2$ is formed, whereas when two mols of sulfur dioxide are reacted per mol of dioxan, the product has the formula $O_2S \cdot O(C_2H_4)_2O \cdot SO_2$. Intermediate amounts of sulfur dioxide result in a mixture of the two products.

The products, which are liquid at normal room temperatures, have a high vapor pressure and volatilize very readily at atmospheric pressure. Because of this tendency to vaporize rapidly at room temperatures, the compounds can be used to excellent advantage as fumigants. Not only do they vaporize readily but they also decompose into sulfur dioxide and dioxan, both of which end-products exert a fumigating and insecticidal effect.

The addition products of dioxan and sulfur dioxide are especially adapted for commercial use as fumigants and insecticides because they can be handled very conveniently as liquids in sealed containers and can be readily transported. Furthermore, the materials vaporize over a period of time, can be released gradually, and provide a prolonged fumigating action. The killing of insects exposed to the vapors from the addition compounds is fast and thorough due to the insecticidal properties of both the dioxan and the sulfur dioxide which are liberated.

While it is well known to fumigate with sulfur dioxide, such fumigating processes have proven to be very cumbersome and hazardous. Heretofore, it was necessary to use compressed sulfur dioxide or to burn either sulfur candles or carbon disulfide absorbed on diatomaceous earth. Unskilled operators could not use compressed gas without endangering themselves, and it was practically necessary to engage professional fumigators. Also, in many instances where, for example, the space to be fumigated was small, the use of compressed sulfur dioxide was impractical. The use of sulfur candles has always left much to be desired. In addition to the dangers attendant upon the burning of sulfur, the method at best was haphazard and it gave no assurance that sufficient sulfur dioxide would be generated for complete and thorough fumigation. Similarly, the burning of carbon disulfide was both unsatisfactory and particularly hazardous.

When the products of this invention are used as fumigants, there is no risk of danger to operators. Furthermore, thorough fumigation is assured because the compounds are of known composition and volatilize completely at room temperature; and, therefore, the amount required for fumigating any given enclosure can be calculated or estimated easily. This also makes for economy, as only the required amount need be used. In the fumigating of insect-infested enclosures, it is necessary only to open a container of the addition products and to vaporize a sufficient amount of compound to kill all insects therein. The container may be, for example, a can with a lid or portion which may be easily removed or punctured. When the container is opened to the atmosphere, the compound begins to volatilize at once but at such a rate that the user is not endangered. Vaporization continues until the required amount has volatilized and fumigation is complete. Warming or heating the compound naturally causes it to vaporize more readily.

By employing either or both of the addition products of dioxan and sulfur dioxide, it is possible to obtain an immediate supply of sulfur dioxide which, together with the vapors of dioxan, has high insecticidal action. Thus, the need of employing highly compressed sulfur dioxide or of burning sulfur is avoided. Alternatively, the compound may be sprayed into enclosures which require fumigation. This can be done very conveniently by means of containers equipped with a thumb-operated valve, such as the so-called siphon used in dispensing charged water or the device used to apply whipped cream by releasing nitrous oxide under pressure. A particularly satisfactory method of employing the material of this invention is to saturate powders, pellets, or balls of clay, diatomaceous earth, talc, and the like, with the compound. These may be kept in sealed containers and used as needed. Extenders, solid carriers, or fillers thus saturated are especially suited for use in small enclosures such as drawers, boxes, closets, et cetera.

Diluents or liquid carriers which are miscible with the addition compound may be used in conjunction therewith. Their presence often facilitates the use of the addition compound. Suitable liquid carriers include miscible hydrocarbon solvents and halogenated hydrocarbon solvents.

The addition products of dioxan and sulfur are prepared by passing the latter into liquid dioxan. It is advisable to maintain the liquid dioxan at lower than room temperatures. Alternatively, the two materials may be reacted in an autoclave under pressure at higher temperatures. Low temperatures are required for the preparation of the compound in which two mols of sulfur dioxide are reacted with one mol of dioxan. Preferably, between one and two mols of sulfur dioxide to dioxan are reacted, although a considerable excess of the diethylene oxide may be present if desired.

The following example illustrates a preferred method of preparing the addition products of diethylene oxide and sulfur dioxide.

Into a tared flask containing 600 grams (5 mols) of dioxan was passed at room temperature 320 grams (5 mols) of sulfur dioxide. The flask was then cooled by immersion in a salt-ice bath, and addition of sulfur dioxide was continued until a total of 640 grams (10 mols) of sulfur dioxide had reacted.

The product of the reaction at room temperature had the formula $O(C_2H_4)_2O \cdot SO_2$, and the final product had the formula $$O_2S \cdot O(C_2H_4)_2O \cdot SO_2$$

Both compounds were liquids at room temperature and had high vapor pressures.

We claim:

1. As a new composition of matter, the addition product of dioxan and sulfur dioxide in the ratio of one mol of the former to two mols of the latter, said product having the formula $$O_2S \cdot O(C_2H_4)_2O \cdot SO_2$$

2. A fumigating and insecticidal material comprising an addition product of dioxan and sulfur dioxide and a solid carrier.

3. A fumigating and insecticidal material comprising an addition product of dioxan and sulfur dioxide and a liquid carrier from the group consisting of hydrocarbon solvents and halogenated hydrocarbon solvents.

4. The method of killing insects which comprises exposing insects to the vapors of an addition product of dioxan and sulfur dioxide.

5. A process for fumigating an insect-infested enclosure which comprises vaporizing at atmospheric pressure within said enclosure the addition products of dioxan and sulfur dioxide in an amount sufficient to kill all insects within said enclosure.

6. The method of killing insects which comprises exposing insects to the vapors of an addition product of dioxan and sulfur dioxide, said product having the formula $O(C_2H_4)_2O \cdot SO_2$.

7. The method of killing insects which comprises exposing insects to the vapors of an addition product of dioxan and sulfur dioxide, said product having the formula $O_2S \cdot O(C_2H_4)_2O \cdot SO_2$.

8. A fumigating and insecticidal composition comprising the compound $O_2S \cdot O(C_2H_4)_2O \cdot SO_2$ and a carrier therefor.

9. A fumigating and insecticidal composition comprising the compound $O_2S \cdot O(C_2H_4)_2O \cdot SO_2$ and a solid carrier therefor.

10. A fumigating and insecticidal composition comprising the compound $O_2S \cdot O(C_2H_4)_2O \cdot SO_2$ and a liquid diluent therefor.

WILLIS CONARD FERNELIUS.
FRANK LESLIE CAMPBELL.